(12) United States Patent
Stiyer et al.

(10) Patent No.: US 8,235,463 B2
(45) Date of Patent: Aug. 7, 2012

(54) CHILD SEAT TETHERING SYSTEM

(75) Inventors: Michael James Stiyer, Grosse Pointe Farms, MI (US); Robin J. Stiyer, Grosse Pointe Farms, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 12/700,794

(22) Filed: Feb. 5, 2010

(65) Prior Publication Data
US 2011/0193394 A1    Aug. 11, 2011

(51) Int. Cl.
*A47C 1/08* (2006.01)
(52) U.S. Cl. .......................... 297/253; 297/254
(58) Field of Classification Search ........... 297/253, 297/254, 484
See application file for complete search history.

(56) References Cited

U.S. PATENT DOCUMENTS

| | | | |
|---|---|---|---|
| 224,776 A | 7/1881 | Wales | |
| 5,299,855 A | 4/1994 | Zubeck | |
| 5,524,928 A * | 6/1996 | Monagas | 297/484 X |
| 6,367,882 B1 * | 4/2002 | Van Druff et al. | 297/484 |
| 6,543,846 B2 * | 4/2003 | Cone | 297/253 |
| D477,692 S | 7/2003 | Hanna | |
| 6,698,841 B1 * | 3/2004 | Glover et al. | 297/484 |
| 7,044,548 B2 * | 5/2006 | Mullen et al. | 297/253 |
| 7,201,452 B1 | 4/2007 | Franks | |
| 7,278,684 B2 * | 10/2007 | Boyle | 297/253 |
| 7,390,064 B2 * | 6/2008 | Horton et al. | 297/254 |
| D576,075 S | 9/2008 | Freeman | |
| 7,488,038 B2 | 2/2009 | Boyle et al. | |
| 2007/0194590 A1 | 8/2007 | Bertoli et al. | |

OTHER PUBLICATIONS

Child Passenger Safety Technical Encyclopedia, Apr. 3, 2009, pp. 1-29, http://www.carseat.org/Technical/tech_update.htm.
DIY Latch Sysem Retrofit, Apr. 3, 2009, pp. 1-8, http://www.instructables.com/id/DIY-LATCH-system-retrofit/.
Howstuffworks, Proper Child Safety Precautions in Automobiles, Apr. 3, 2009, pp. 1-3, http://www.howstuffworks.com/28006-proper-child-safety-precautions-in-automobiles.htm/.

* cited by examiner

*Primary Examiner* — Anthony D Barfield
(74) *Attorney, Agent, or Firm* — Frank A. MacKenzie; Brooks Kushman P.C.

(57) ABSTRACT

A system and method to tether a child seat to a vehicle seat is disclosed. The child seat has a latch strap engaging with a lower back of the child seat and a top tether strap coupled to a top of the child seat. An adapter plate is provided which has first, second, and third apertures with the first and second apertures receiving first and second connectors coupled to first and second ends of the latch strap and the third aperture receiving a third connector coupled to the top tether strap. The latch strap ends are threaded through the seat bight and coupled to first and second apertures of the adapter plate. The top tether strap connector is coupled to the third aperture. Each strap has a cinch, which is adjusted to tighten the straps.

12 Claims, 5 Drawing Sheets

CHILD SEAT TETHERING SYSTEM

BACKGROUND

1. Technical Field

The disclosure relates to a tethering system for a child seat to a vehicle seat.

2. Background Art

Under its rule making authority, the National Highway Transportation Safety Administration (NHTSA) has promulgated rules concerning the tethering of child seats within an automotive vehicle. In particular, child seats are provided with a latch strap, which engages with the child seat near a bottom back side of the child seat, and a top tether strap, which is coupled to the top of the child seat. Vehicle seats, which are configured to restrain a child seat intended for children up to 40 pounds, are provided with lower anchors to which the latch strap is attached. The vehicle interior also contains a top anchor to which the top tether strap is secured. The top anchor can be integrated with the seat back, e.g., at the back of the seat or the top of the seat. The top anchor can be mounted in the vehicle roof or other locations within the interior of the vehicle.

Many vehicles have second and third row seating suitable for children. However, not every second or third row vehicle seat is provided with the anchors. Families with multiple children requiring child seats or day care providers may wish to transport more children than the number of seats having anchoring systems. Or, it may be desirable to attach the child seats in locations in the vehicle that are not equipped with anchoring systems for overall passenger convenience and flexibility. One solution would be for the manufacturer to provide an anchoring system at each seat location. However, such a solution increases cost and weight of the vehicle for all customers even though only a small fraction of customers will ever require multiple anchoring systems. And, such a solution does not address the situation that vehicles produced prior to the NHTSA rules do not have such anchoring systems. It would be desirable to properly secure child seats in vehicle seats that do not have factory-installed anchoring systems.

SUMMARY

To overcome at least one problem in the prior art, a tethering system for a child seat is disclosed which includes an adapter plate with first, second, and third apertures. The first and second apertures are adapted to receive first and second connectors of a latch strap of the child seat. The first and second connectors are coupled to first and second ends of the latch strap, respectively. The third aperture is adapted to receive a third connector attached to a top tether strap coupled to a top of the child seat. In some alternatives, the latch strap is threaded through a passage proximate a lower back of the child seat. The vehicle seat to which the child seat is tethered can be a portion of a bench seat or a captain's chair or any other suitable seating surface. The latch strap has a cinch to make the latch strap taut when installed. Similarly, the top tether strap has a cinch to allow tightening of the top tether strap. In some situations, the child seat is tethered to the vehicle via the normally-provided seatbelts. In such cases, the tethering system with the adapter plate provides an additional way to secure the child seat into the vehicle. Some people have difficulty in securely attaching the child seats with only the seatbelt. Thus, an advantage according to the present disclosure, is that the child seat can be more securely attached to the vehicle seat even when no anchoring system is provided.

A method to attach a child seat onto a vehicle seat includes: sliding first and second connectors coupled to the latch strap of the child seat through the vehicle seat bight (intersection between the seat back and the seat base), coupling first and second connectors to first and second apertures of an adapter plate, coupling the third connector associated with a top tether strap of the child seat with a third aperture of the adapter plate, cinching the latch strap, and cinching the top tether strap. The disclosed method is used in conjunction with attaching the child seat to the vehicle seat with the seatbelt. The upper tether anchor is provided in addition to using a vehicle seatbelt to more securely attach an upper part of the child seat to the vehicle seat than by seatbelt attachment solely. The seatbelt attaching can be performed prior to or following the upper tether anchoring.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate to tethering a child seat in an automotive vehicle. The present development applies to other types of vehicles. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
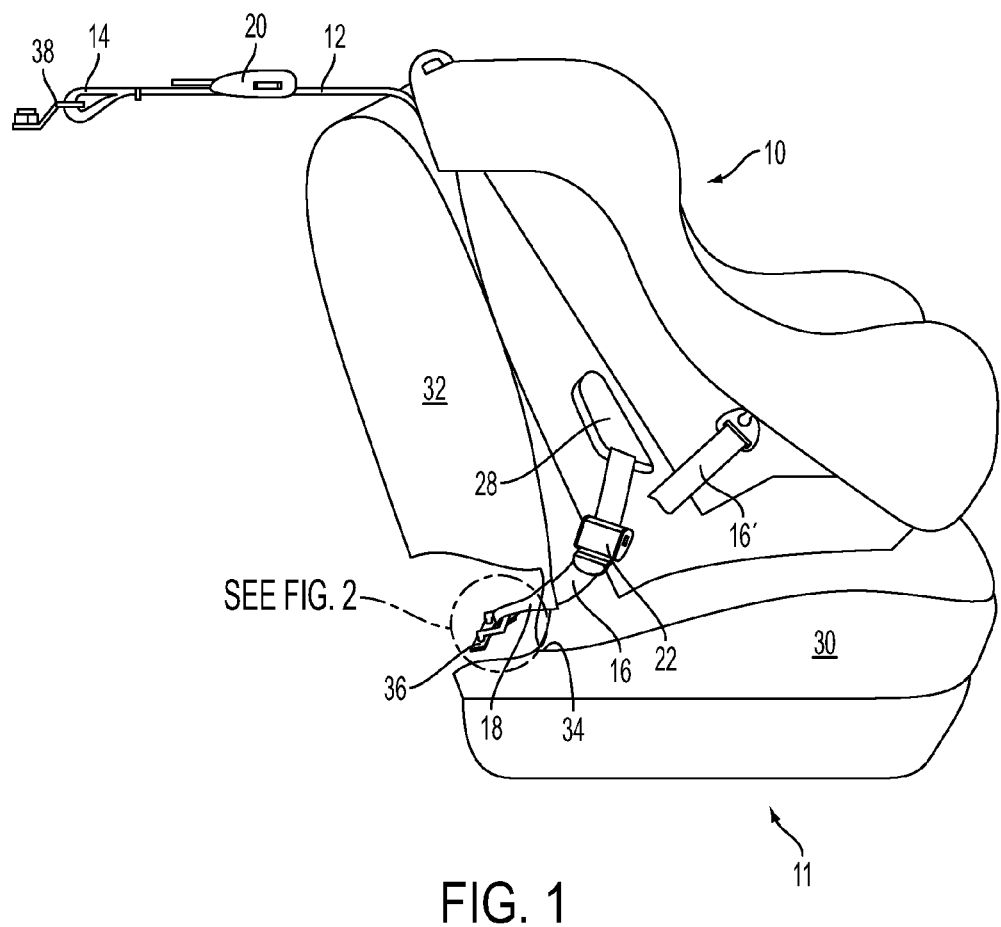
FIG. 1 is a side view of a vehicle seat onto which a child seat is tethered.

A child seat 10 is shown installed onto a vehicle seat 11 in FIG. 1. Child seat 10 is provided with a top tether strap 12 which has a connector 14 on the far end of top tether strap 12. Child seat 10 also has a latch strap 16 with a connector 18. Top tether strap 12 and latch strap 16 are provided with cinches 20 and 22. Cinches 20 and 22 are provided to adjust the lengths of top tether strap 12 and latch strap 16 to secure child seat 10 to vehicle seat 11. Latch strap 16 threads through a passage 28.

Vehicle seat 11 has a seat base 30 and a seat back 32. The intersection between seat base 30 and seat back 32 is sometimes referred to as a seat bight 34. Vehicle seat 11 has a lower anchor 36 coupled to seat base 30 located in or near seat bight 34.

Figure 2:
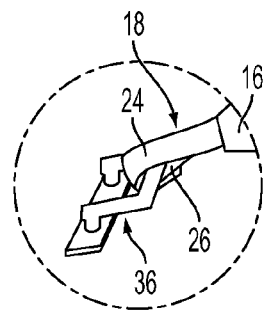
FIG. 2 is a detailed view of one embodiment of a connector used to fasten a strap to an anchor.

Connector 18 can be any suitable type. A detail of one embodiment is shown in FIG. 2 in which connector 18 has a hook portion 22 and a spring-loaded latch portion 24. By pressing spring-loaded latch 24 toward hook 22, hook 22 can be accessed by the loop portion of lower anchor 36. When spring-loaded latch 24 is no longer being pressed, it springs back to close off the opening to connector 18 to prevent connector 18 from being inadvertently disconnected from lower anchor 36.

Referring back to FIG. 1, latch strap 16 is connected on the one end to connector 18 which engages with lower anchor 36. On the other end of latch strap 16 is provided with a second connector (not shown) which engages with a second lower anchor (also not shown in this view). By engaging the connectors with the lower anchors and tightening latch strap 16 via cinch 22, the lower end of child seat 10 is secured to vehicle seat 11.

In an alternative embodiment, latch straps 16' are provided on both sides of the child seat. In FIG. 1, only one latch strap 16' is visible. Furthermore, only a portion of latch strap 16' is shown. Each latch strap 16' is coupled to the child seat on one end and coupled to a connector (not shown, but similar to connector 18 on latch strap 16) on the other end. Both latch straps 16' are provided with a cinching mechanism, such as cinch 22 or any other suitable cinching mechanism.

Figure 3:
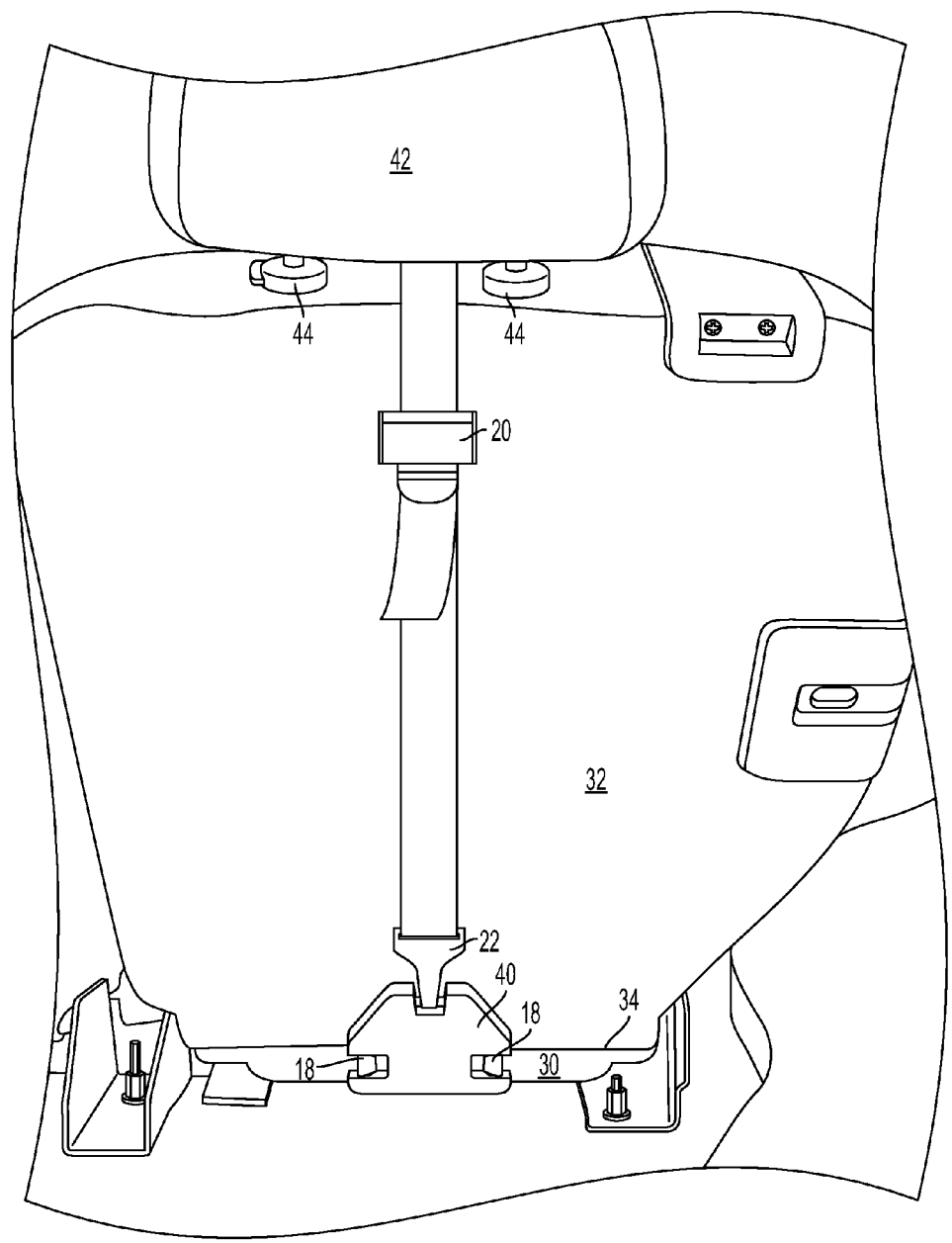
FIGS. 3 and 4 are rear views of a vehicle seat in which a child seat is secured via an adapter plate according to embodiments of the disclosure.

In FIG. 3, a rear view of a vehicle seat is shown. The child seat is largely not shown in this view. Connectors 18 are shown coupled to an adapter plate 40. Connectors 18 are at the ends of the latch strap (not shown). Connectors 18 are fished through seat bight 34 and clasped to adapter plate 40. Top tether strap 12 is slid underneath headrest 42 toward the back of seat back 32. Connector 22 is coupled with adapter plate 40. Cinch 20 is used to adjust the length of top tether strap 12 so that it is taut. The latch strap also has a cinch; but, it is not seen in this view. Adapter plate 40, in one embodiment, is not coupled to either seat back 32 or seat base 30. According to such embodiment, adapter plate 40, when not coupled to connectors 18 and 22, is a separate element. This presents an advantage in that it can be moved among seat positions so that a child seat can be attached to whichever seat is preferred. Also, adapter plate 40 need not be affixed to the car seat during vehicle assembly. Thus, adapter plate 40 can be used in existing vehicles. Adapter plate 40 bears against the rear surface of seat base 30 and seat back 32 in the vicinity of seat bight 34 when loaded by latch strap 16 and/or top tether strap 12.

Figure 4:
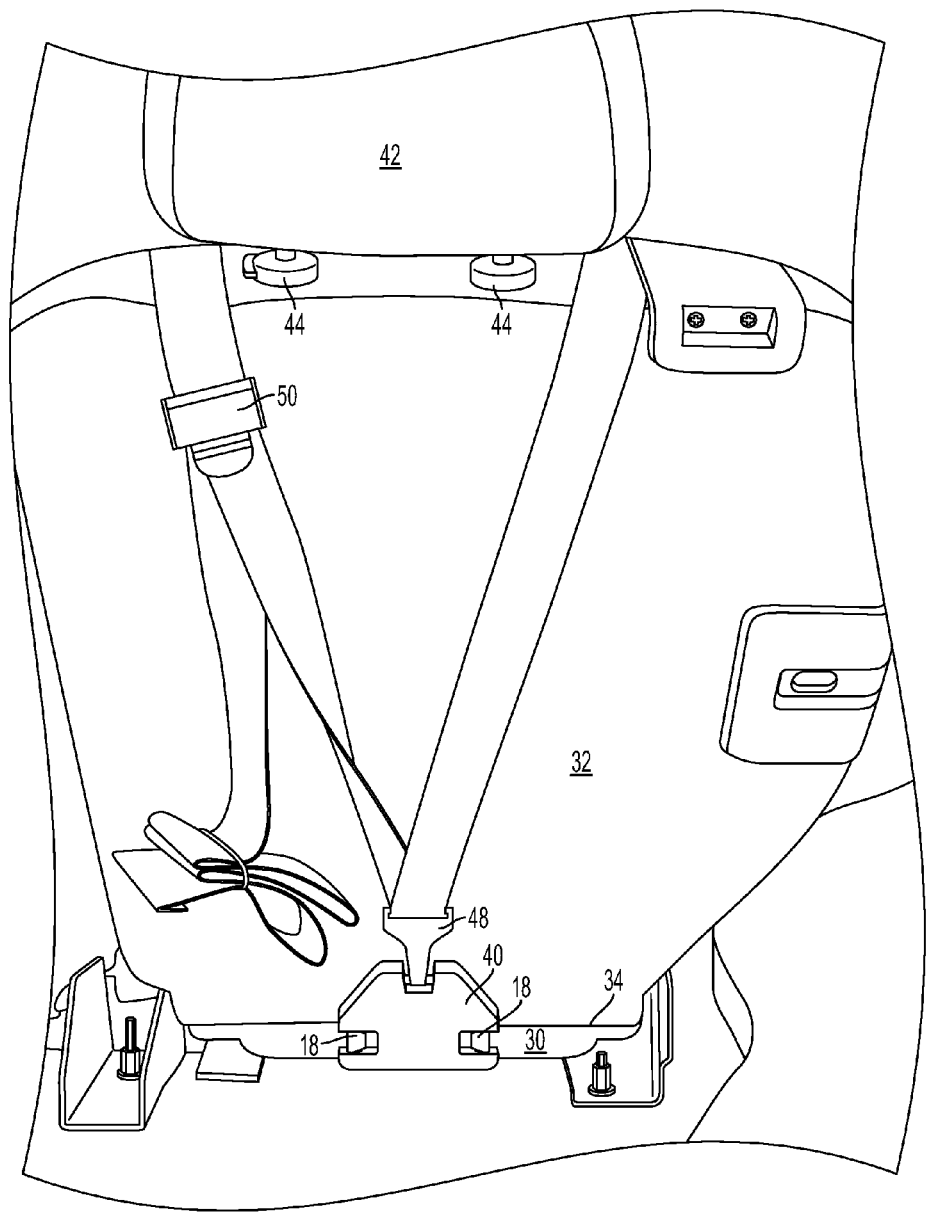

In FIG. 4, top tether strap 46 forms a loop extending away from the child seat (not visible in this view). Top tether strap 46 loops over head rest 42. Top tether strap 46 has a connector 48, which engages with adapter plate 40. Connector 48 can be slid along top tether strap 46 so that an appropriate length of top tether strap 46 is available on both sides of connector 48. Also, top tether strap 46 has a cinch 50 that can be used to pull top tether strap 46 taut. In one alternative, top tether strap is coupled to the child seat in two locations. In another alternative, top tether strap forms a continuous loop and engages with a passage in the child seat, similar to how latch strap 16 of FIG. 1 engages with passage 28. From the view in FIG. 4, the loop of top tether strap 46 forms a vee. Connector 48 is at a lower point of the vee. The upper tips of the vee pass on either side of heat rest guides 44. In one embodiment the upper tips continue to thread through an opening near the top of the child seat (not shown in this view). In another alternative, the upper tips continue to the child seat and are affixed to near the top of the child seat (also not shown in this view).

Figure 5:
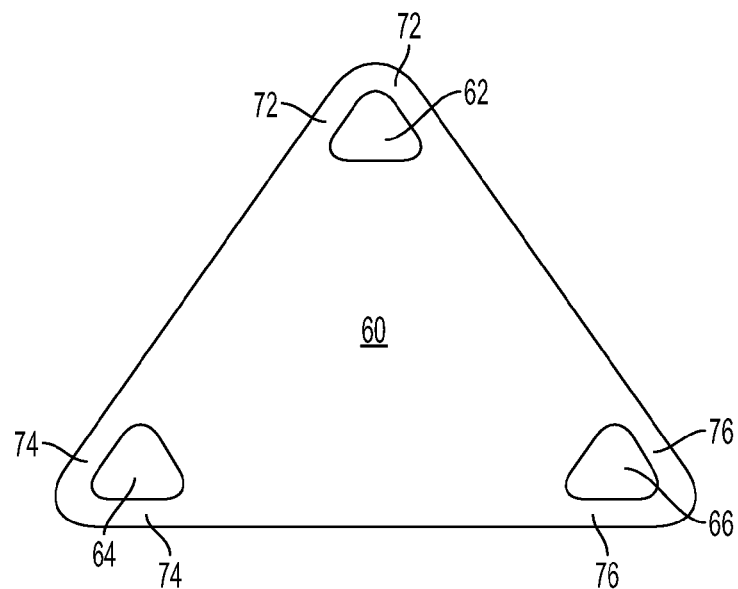
FIGS. 5 and 6 are adapter plates according to embodiments of the disclosure.

In FIG. 5, one embodiment of an adapter plate 60 is shown. Adapter plate 60 has apertures 62, 64, and 66. The distance of apertures 62, 64, and 66 from the edge of adapter plate 60 are selected so that ribs 72, 74, and 76 have sufficient cross-sectional area for strength, but small enough to allow engagement with the connectors of commercially-available child seats. The size of apertures 62, 64, and 66 are determined so that connectors of commercially-available child seats can be easily engaged with ribs 72, 74, and 76.

Figure 6:
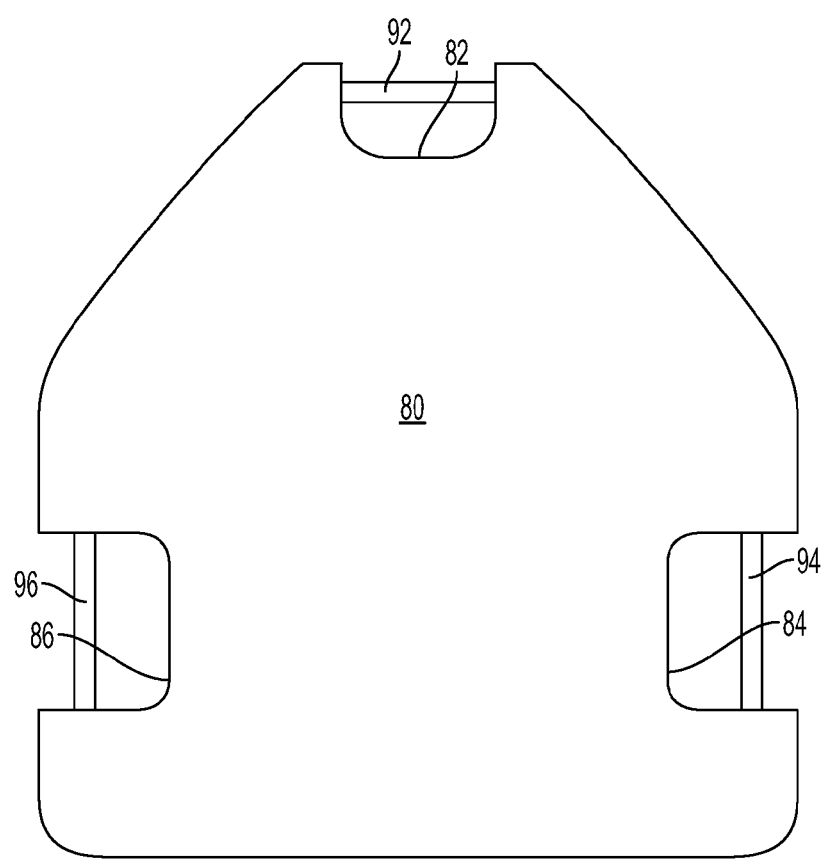

In FIG. 6, an alternative embodiment of an adapter plate 80 has cutouts 82, 84, and 86. Across the openings of cutouts 82, 84, and 86, pins 92, 94, and 96 are inserted. Connector 14 and connectors 18 engage with pins 92, 94, and 96 to secure the child seat into position. As shown in FIG. 6, the diameter of pins 92, 94, and 96 are about the same. Depending on the range of connectors available on commercially-available child seats, pin 92 coupling with connector 14 may be a different diameter than pins 94 and 96 which couple with connectors 18. Additionally, the shape of cutouts 82, 84, and 86, are designed so that there is ample clearance for the connectors to grab onto pins 92, 94, and 96. The cutout/pin pairs (82/92, 84/94, and 86/96) form first, second, and third apertures in plate 80 to provide access for connectors to grab onto pins 92, 94, and 96.

In another alternative, the adapter plate can have a wire frame, with the apertures formed by loops in the wire. Then, a plastic can be overmolded to form the plate.

Figure 7:
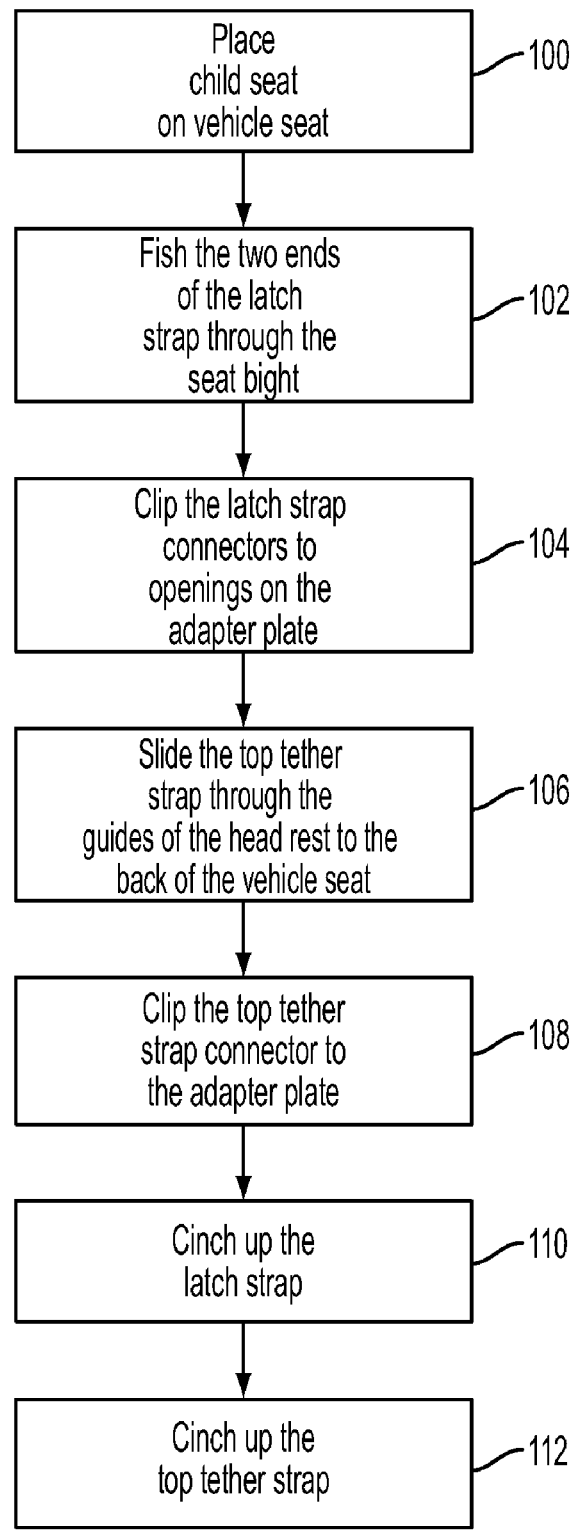
FIG. 7 is a flowchart showing a method to attach the child seat upper tether attached to the vehicle seat via an adapter plate according to one embodiment of the disclosure.

In FIG. 7, a method to install a child seat to a vehicle seat is shown in a flowchart form. The child seat is placed on the vehicle seat in block 100. The two ends of the latch strap are threaded through the seat bight in block 102 [103: position 40 behind rear surface of bight . . . ] and then clipped to the adapter plate in block 104 with the adapter plate positioned behind the seat bight. The top tether strap is slid between the headrest guides and the seat back and then to the back of the vehicle seat in block 106. In block 108, the connector of the top tether strap is coupled to the adapter plate. In blocks 110 and 112, the latch strap and top tether strap are cinched up. The order of the blocks in FIG. 7 is not intended to be limiting. As described above, the upper tether method is provided to supplement the child seat being attached to the vehicle seat with the seatbelt.

While the best mode has been described in detail, those familiar with the art will recognize various alternative designs and embodiments within the scope of the following claims. For example, the child seat that is to be tethered to the vehicle seat may have latch straps coupled to both side of the child sear or have a single latch strap that engages with a passage on the back of the child seat. The adapter plate accommodates either alternative. The top tether strap may be threaded through guides of the headrest in one alternative or loop around the headrest in another alternative. Again, the adapter plate accommodates both alternatives. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A system to tether a child seat to a vehicle seat, the child seat having a latch strap engaging with a lower back of the child seat and a top tether strap coupled to a top of the child seat, comprising:
    an adapter plate having first, second, and third apertures wherein the first and second apertures are adapted to receive first and second connectors coupled to first and second ends of the latch strap and the third aperture is adapted to couple to a third connector coupled to the top tether strap.

2. The system of claim 1 wherein the first and second ends of the latch strap are threaded between a seat back and a seat base of the vehicle seat to access the adapter plate.

3. The system of claim 1 wherein the seat back has a headrest and the top tether strap threads through guides associated with the headrest and down the back of the vehicle seat to access the adapter plate.

4. The system of claim 1 wherein the top tether strap forms a vee with a lower point of the vee coupled to the adapter plate and upper tips of the vee coupled to the child seat proximate a top of the child seat.

5. The system of claim 1 wherein the top tether strap forms a loop which engages with the top of the child seat, the third connector is slidingly coupled to the loop, and the loop is placed over a head rest coupled to the vehicle seat.

6. The system of claim 1 wherein the top tether strap has a first cinch and the latch strap has a second cinch.

7. A method to attach a child seat onto a vehicle seat, the child seat having a latch strap with first and second connectors and a top tether strap with a third connector, comprising:
    sliding first and second connectors through a seat bight of the vehicle seat;
    coupling first and second connectors to first and second apertures of an adapter plate; and
    coupling the third connector with a third aperture of the adapter plate.

8. The method of claim 7, further comprising:
    cinching the latch strap; and
    cinching the top tether strap.

9. The method of claim 7 wherein the adapter plate is located proximate a back of the vehicle seat.

10. The method of claim 7, further comprising:
    placing the top tether strap over a top of the vehicle seat prior to coupling the top tether strap with the adapter plate.

11. The method of claim 7 wherein the vehicle seat has a headrest coupled to the vehicle seat via guides, the method further comprising:
    threading the top tether strap between the guides of the headrest prior to coupling the third connector with the third aperture of the adapter plate.

12. The method of claim 7 wherein the seat bight comprises the intersection between a seat back and a seat base of the vehicle seat.

* * * * *